US012191606B2

United States Patent
(12) United States Patent
Fukuyama et al.

(10) Patent No.: US 12,191,606 B2
(45) Date of Patent: Jan. 7, 2025

(54) CONNECTOR AND WIRING HARNESS

(71) Applicant: SUMITOMO WIRING SYSTEMS, LTD., Mie (JP)

(72) Inventors: Kyoko Fukuyama, Mie (JP); Kaishi Izumi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 367 days.

(21) Appl. No.: 17/865,673

(22) Filed: Jul. 15, 2022

(65) Prior Publication Data

US 2023/0012673 A1 Jan. 19, 2023

(30) Foreign Application Priority Data

Jul. 16, 2021 (JP) ................................ 2021-117852

(51) Int. Cl.

| | |
|---|---|
| ***H01R 13/6592*** | (2011.01) |
| ***H01B 7/00*** | (2006.01) |
| ***H01R 11/12*** | (2006.01) |

(52) U.S. Cl.

CPC ....... *H01R 13/6592* (2013.01); *H01B 7/0045* (2013.01); *H01R 11/12* (2013.01); *H01R 2201/26* (2013.01)

(58) Field of Classification Search

None

See application file for complete search history.

(56) References Cited

U.S. PATENT DOCUMENTS

| | | | | |
|---|---|---|---|---|
| 10,158,192 | B1 * | 12/2018 | Yokotani | H01R 13/5845 |
| 11,322,878 | B2 * | 5/2022 | Miyamoto | H01R 9/24 |
| 2015/0129305 | A1 | 5/2015 | Yoshida et al. | |
| 2016/0255750 | A1 * | 9/2016 | Yoshida | H01B 7/04 174/359 |
| 2018/0019549 | A1 * | 1/2018 | Makido | H01R 13/5216 |
| 2018/0294593 | A1 * | 10/2018 | Lida | H01R 13/6581 |

* cited by examiner

*Primary Examiner* — Oscar C Jimenez

(74) *Attorney, Agent, or Firm* — Venjuris, P.C.

(57) ABSTRACT

A connector is provided with three or more terminals to be respectively connected to wires, and a housing for holding the three or more terminals. The three or more terminals are arranged along a first direction. Each of the terminals includes a wire connecting portion to be connected to the wire, a terminal connecting portion to be connected to a mating terminal and an intermediate portion provided between the wire connecting portion and the terminal connecting portion. Three or more of the terminal connecting portions are arranged at intervals along the first direction. Three or more of the wire connecting portions are arranged at intervals along the first direction. The intervals and the intervals are different from each other. Three or more of the intermediate portions are formed to have mutually different shapes according to differences between the intervals and the intervals.

12 Claims, 6 Drawing Sheets

CONNECTOR AND WIRING HARNESS

CROSS-REFERENCE TO RELATED APPLICATIONS

This application is based on and claims priority from Japanese Patent Application No. 2021-117852, filed on Jul. 16, 2021, with the Japan Patent Office, the disclosure of which is incorporated herein in its entirety by reference.

TECHNICAL FIELD

The present disclosure relates to a connector and a wiring harness.

BACKGROUND

Conventionally, a wiring harness is known which electrically connects electrical devices installed in a vehicle (see, for example, Japanese Patent Laid-open Publication No. 2015-095357). A connector to be mounted on the electrical device is provided on one end of the wiring harness. The connector of this type includes a housing made of resin and having an opening, a plurality of terminals integrally formed to the housing, and a plate made of metal. The plurality of terminals are provided side by side along one direction.

SUMMARY

In the above connector, an improvement of assembling workability is desired and, in this respect, there has been a room for improvement.

The present disclosure aims to provide a connector and a wiring harness capable of improving assembling workability.

The present disclosure is directed to a connector with three or more first terminals to be electrically connected to wires, and a housing for holding the three or more first terminals, wherein the three or more first terminals are arranged along a first direction, each of the first terminals includes a first wire connecting portion to be connected to the wire, a first terminal connecting portion to be connected to a mating terminal and a first intermediate portion provided between the first wire connecting portion and the first terminal connecting portion, three or more of the first terminal connecting portions are arranged at first intervals along the first direction, three or more of the first wire connecting portions are arranged at second intervals along the first direction, the first intervals and the second intervals are different from each other, three or more of the first intermediate portions are formed to have mutually different shapes according to differences between the first intervals and the second intervals, and the three or more first terminals include identifying portions for mutual identification.

The present disclosure is directed to a wiring harness with a first connector including three or more first terminals and a housing for holding the three or more first terminals, a second connector including three or more third terminals, and three or more wires for electrically connecting the respective first terminals and the respective third terminals, wherein the three or more first terminals are arranged along a first direction, each of the first terminals includes a first wire connecting portion to be connected to the wire, a first terminal connecting portion to be connected to a mating terminal and a first intermediate portion provided between the first wire connecting portion and the first terminal connecting portion, the three or more third terminals are arranged along the first direction, each of the third terminals includes a third wire connecting portion to be connected to the wire, three or more of the first terminal connecting portions are arranged at first intervals along the first direction, three or more of the first wire connecting portions are arranged at second intervals along the first direction, three or more of the third wire connecting portions are arranged at the second intervals along the first direction, the first intervals and the second intervals are different from each other, three or more of the first intermediate portions are formed to have mutually different shapes according to differences between the first intervals and the second intervals, and the three or more first terminals include identifying portions for mutual identification.

According to the connector and the wiring harness of the present disclosure, an effect capable of improving assembling workability is achieved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
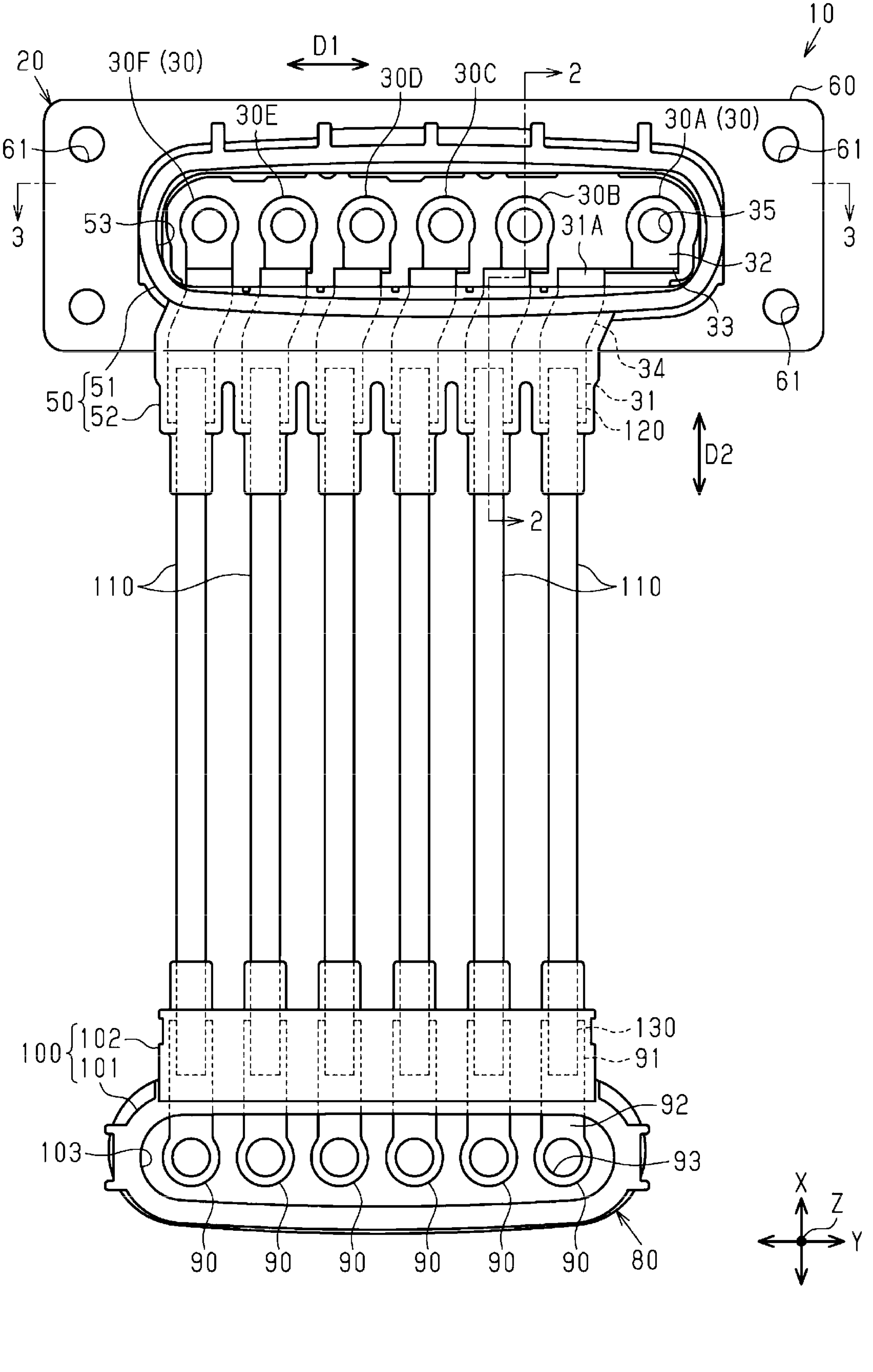
FIG. 1 is a schematic plan view showing a wiring harness of an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

[Description of Embodiments of Present Disclosure]

First, embodiments of the present disclosure are listed and described.

[1] The connector of the present disclosure is provided with three or more first terminals to be electrically connected to wires, and a housing for holding the three or more first terminals, wherein the three or more first terminals are arranged along a first direction, each of the first terminals includes a first wire connecting portion to be connected to the wire, a first terminal connecting portion to be connected to a mating terminal and a first intermediate portion provided between the first wire connecting portion and the first terminal connecting portion, three or more of the first terminal connecting portions are arranged at first intervals along the first direction, three or more of the first wire connecting portions are arranged at second intervals along the first direction, the first intervals and the second intervals are different from each other, three or more of the first intermediate portions are formed to have mutually different shapes according to differences between the first intervals and the second intervals, and the three or more first terminals include identifying portions for mutual identification.

According to this configuration, each first terminal includes the first wire connecting portion, the first terminal connecting portion and the first intermediate portion, the three or more first terminal connecting portions are arranged at the first intervals, and the three or more first wire connecting portions are arranged at the second intervals different from the first intervals. Further, the three or more of the first intermediate portions are formed to have mutually different shapes according to the differences between the first intervals and the second intervals. Thus, the three or more first terminals have mutually different shapes. In this case, if the three or more first terminals are identified based only on shape differences of the first intermediate portions, such as when the connector is assembled, a lot of time is required for identification. In this way, the assembling workability of the connector is reduced. In contrast, in the connector of the present disclosure, the identifying portions for mutual identification are provided in the three or more first terminals. In this way, even if the three or more first terminals have mutually different shapes, the three or more first terminals can be easily identified based on the identifying portions. Thus, a time required to identify the three or more first terminals can be shortened and the assembling workability of the connector can be improved.

[2] Preferably, the three or more first terminal connecting portions are arranged at regular first intervals along the first direction, the three or more first wire connecting portions are arranged at regular second intervals along the first direction, deviation amounts in the first direction between the first wire connecting portions and the first terminal connecting portions in the three or more first terminals increase in an arithmetic progression according to the differences between the first intervals and the second intervals, and the three or more first intermediate portions are formed to have mutually different shapes according to the deviation amounts in the corresponding first terminals.

According to this configuration, the three or more first terminal connecting portions are provided side by side at the regular first intervals, and the three or more first wire connecting portions are provided side by side at the regular second intervals. Further, the three or more first intermediate portions are formed to have mutually different shapes according to the deviation amounts in the first direction between the first wire connecting portions and the first terminal connecting portions. Thus, the differences between the first intervals and the second intervals can be absorbed by the shapes of the respective first intermediate portions. That is, the differences between the first intervals and the second intervals can be absorbed only by the structures of the first terminals. For example, the differences between the first intervals and the second intervals can be absorbed only by the structures of the first terminals without setting lengths of the wires to be connected to the first terminals to mutually different lengths.

[3] Preferably, each of the first terminals has a width extending in the first direction, and the differences between the first intervals and the second intervals are smaller than the width of the first terminal.

According to this configuration, the differences between the first intervals and the second intervals are smaller than the width of the first terminal. Thus, a change amount of the deviation amount in the first direction between the first wire connecting portion and the first terminal connecting portion, specifically a change amount of the deviation amount in two first terminals adjacent in the first direction, is smaller than the width of the first terminal. In this way, a degree of shape change in the first intermediate portions becomes smaller in the two first terminals adjacent in the first direction. As a result, it becomes more difficult to identify the three or more first terminals only by the shape differences. Thus, as the differences between the first intervals and the second intervals become smaller, an effect brought about by providing the identifying portion in each first terminal more notably appears.

[4] Preferably, the identifying portion is provided in a part of the first terminal not covered by the housing.

According to this configuration, the identifying portion is provided in the part of the first terminal not covered by the housing. Thus, the identifying portion can be confirmed, for example, even in a state where the first terminal is held by the housing. Therefore, the three or more first terminals can be easily identified based on the identifying portions even in the state where the first terminals are held by the housing.

[5] Preferably, the housing includes an opening, each of the first terminals includes the first wire connecting portion extending in a second direction intersecting the first direction toward inside of the opening, the first intermediate portion extending along a penetration direction of the opening from the inside of the opening, and the first terminal connecting portion extending toward a side opposite to the first wire connecting portion from the first intermediate portion in the second direction, and the identifying portion is provided on a surface of the first intermediate portion extending along the penetration direction.

According to this configuration, the identifying portion is provided on the surface of the first intermediate portion extending along the penetration direction of the opening. Thus, the identifying portion is easily visually confirmed through the opening, for example, even in the state where the first terminal is held by the housing. Therefore, the three or more first terminals can be easily identified based on the identifying portions.

[6] Preferably, the identifying portion is printing formed on the first terminal.

According to this configuration, the identifying portion is formed by printing. Thus, the interference of, for example, the finger of a worker, who is assembling the connector, with the identifying portion can be suppressed. In this way, the assembling workability of the connector can be improved. Further, an increase in the size of the first terminal due to the provision of the identifying portion can be suitably suppressed.

[7] Preferably, the connector is further provided with a second terminal provided side by side with the three or more first terminals along the first direction, and an interlock connector provided between the first terminal and the second terminal in the first direction, the second terminal including the identifying portion.

According to this configuration, the interlock connector is provided between the first terminal and the second terminal in the first direction. Whether or not the connector is connected to a connection object at a proper position can be easily detected by this interlock connector. Further, since the second terminal is also provided with the identifying portion, the first terminals and the second terminal can be easily identified based on the identifying portions.

[8] Preferably, the second terminal includes a second wire connecting portion to be connected to the wire, a second terminal connecting portion to be connected to the mating terminal and a second intermediate portion provided between the second wire connecting portion and the second terminal connecting portion, an interval between the first terminal connecting portion and the second terminal connecting portion adjacent in the first direction is larger than the first intervals, and an interval between the first wire connecting portion and the second wire connecting portion adjacent in the first direction is equal to the second intervals.

According to this configuration, the interval between the first terminal connecting portion and the second terminal connecting portion adjacent in the first direction is set larger than the first intervals. Thus, the interlock connector can be, for example, suitably provided between the first terminal connecting portion and the second terminal connecting portion.

[9] Preferably, the number of the first terminals is five or more.

According to this configuration, since five or more first terminals having mutually different shapes are provided, the types of components increase. In this case, it becomes cumbersome to identify the five or more first terminals. Thus, as the number of the first terminals increases, the effect brought about by providing the identifying portions in the respective first terminals more notably appears.

[10] The wiring harness of the present disclosure is provided with a first connector including three or more first terminals and a housing for holding the three or more first terminals, a second connector including three or more third terminals, and three or more wires for electrically connecting the respective first terminals and the respective third terminals, wherein the three or more first terminals are arranged along a first direction, each of the first terminals includes a first wire connecting portion to be connected to the wire, a first terminal connecting portion to be connected to a mating terminal and a first intermediate portion provided between the first wire connecting portion and the first terminal connecting portion, the three or more third terminals are arranged along the first direction, each of the third terminals includes a third wire connecting portion to be connected to the wire, three or more of the first terminal connecting portions are arranged at first intervals along the first direction, three or more of the first wire connecting portions are arranged at second intervals along the first direction, three or more of the third wire connecting portions are arranged at the second intervals along the first direction, the first intervals and the second intervals are different from each other, three or more of the first intermediate portions are formed to have mutually different shapes according to differences between the first intervals and the second intervals, and the three or more first terminals include identifying portions for mutual identification.

According to this configuration, each first terminal includes the first wire connecting portion, the first terminal connecting portion and the first intermediate portion, the three or more first terminal connecting portions are arranged at the first intervals, and the three or more first wire connecting portions are arranged at the second intervals different from the first intervals. Further, the three or more of the first intermediate portions are formed to have mutually different shapes according to the differences between the first intervals and the second intervals. Thus, the three or more first terminals have mutually different shapes. In this case, if the three or more first terminals are identified based only on shape differences of the first intermediate portions, such as when the first connector and the wiring harness are assembled, a lot of time is required for identification. In this way, the assembling workability of the wiring harness is reduced. In contrast, in the wiring harness of the present disclosure, the identifying portions for mutual identification are provided in the three or more first terminals. In this way, even if the three or more first terminals have mutually different shapes, the three or more first terminals can be easily identified based on the identifying portions. Thus, a time required to identify the three or more first terminals can be shortened and the assembling workability of the wiring harness can be improved.

[11] Preferably, the respective wires have the same length.

According to this configuration, the respective wires have the same length. Thus, an increase in the types of components can be suppressed as compared to the case where the respective wires have different lengths.

[12] Preferably, one of the first connector and the second connector is electrically connected to an inverter, the other of the first connector and the second connector is electrically connected to a motor, and the three or more wires are high-voltage wires to which a high voltage is applied.

According to this configuration, the wiring harness can be applied to an electrically conductive path between the inverter and the motor, to which a high voltage is applied.

[Details of Embodiment of Present Disclosure]

Specific examples of a connector and a wiring harness of the present disclosure are described below with reference to the drawings. In each figure, some of components may be shown in an exaggerated or simplified manner for the convenience of description. Further, a dimension ratio of each part may be different in each figure. XYZ axes orthogonal to each other are shown in each figure. "Orthogonal" in this specification means not only strictly orthogonal, but also substantially orthogonal within a range in which functions and effects in this embodiment are achieved. Further, in this specification, "along" preferably means that an angle between a reference direction and an extending direction of an object is 10° or less. In this case, the angle between the reference direction and the extending direction of the object is preferably 5° or less, more preferably 1° or less and most preferably 0°, i.e. these directions are parallel. Note that the present invention is not limited to these illustrations and is intended to be represented by claims and include all changes in the scope of claims and in the meaning and scope of equivalents.

(Configuration of Wiring Harness 10)

As shown in FIG. 1, a wiring harness 10 includes a connector 20 having three or more terminals 30. The three or more terminals 30 are provided side by side along a first direction D1. The first direction D1 of this embodiment is a direction along the Y axis. The wiring harness 10 includes a connector 80 having three or more terminals 90. The three or more terminals 90 are provided side by side along the first direction D1. The wiring harness 10 includes, for example, three or more wires 110 for electrically connecting the respective terminals 30 and the respective terminals 90. The wiring harness 10 is for electrically connecting electrical devices for vehicle such as a motor and an inverter. The connector 20 is, for example, electrically connected to the inverter. The connector 80 is, for example, electrically connected to the motor.

(Configuration of Wires 110)

Figure 2:
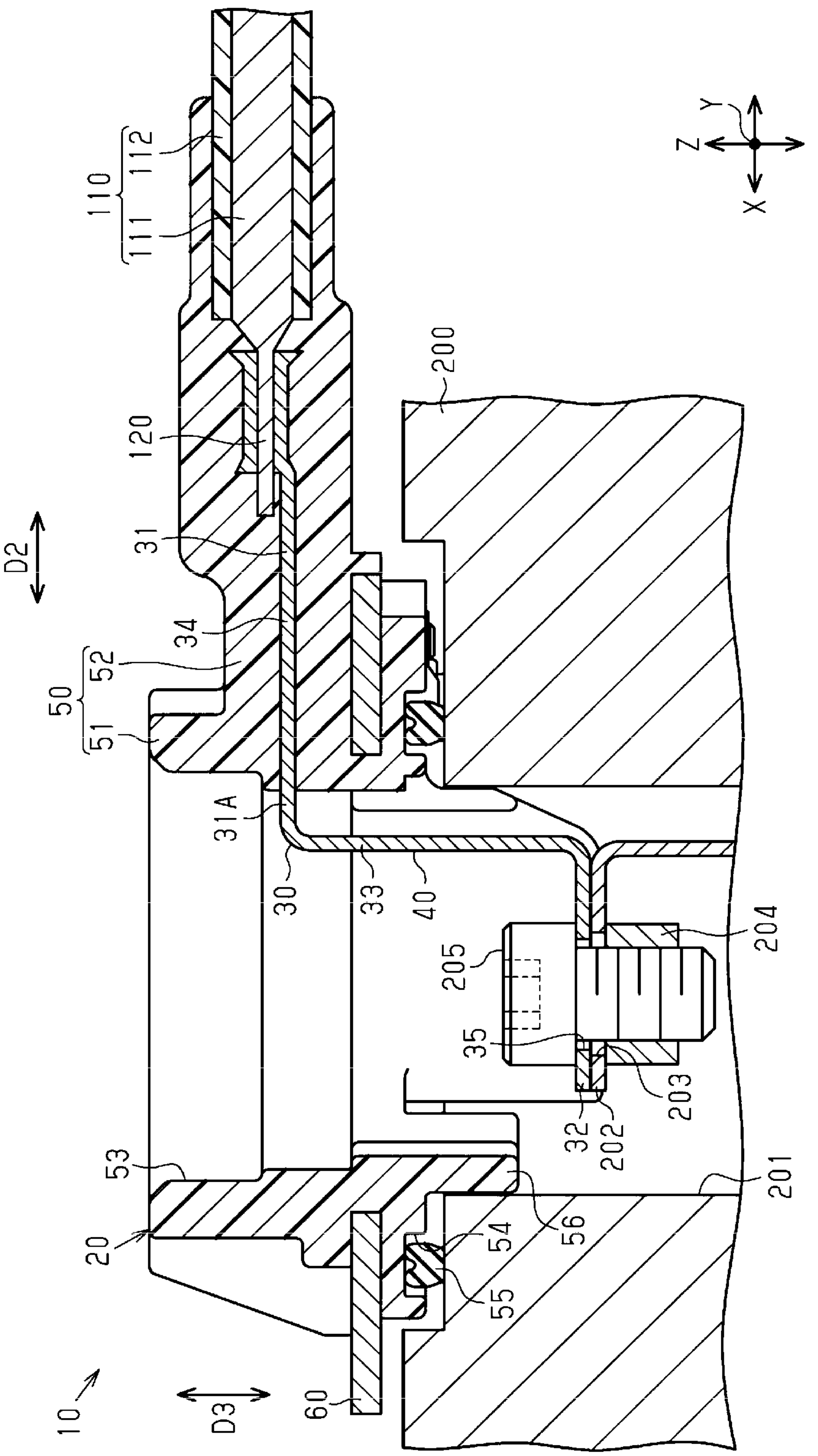
FIG. 2 is a schematic section (section along 2-2 in FIG. 1) showing the wiring harness of the embodiment.

As shown in FIG. 2, each wire 110 includes a core wire 111 having an electrical conductivity and an insulation coating 112 surrounding the outer periphery of the core wire 111 and having an insulating property. Each wire 110 is, for example, a high-voltage wire to which a high voltage is applied. The "high-voltage wire" in this specification is a wire specified in "JASO D624(2015)". A rated voltage of the high-voltage wire is 30 V or more and 600 V or less in the case of an alternating current voltage, and is 60 V or more and 750 V or less in the case of a direct current voltage.

Each wire 110 includes a first connecting portion 120 to be connected to the terminal 30. The first connecting portion 120 is provided on one end in a longitudinal direction of the wire 110. In the first connecting portion 120, an end part of the core wire 111 is exposed from the insulation coating 112. In the first connecting portion 120, the end part of the core wire 111 exposed from the insulation coating 112 is connected to the terminal 30. As shown in FIG. 1, each wire 110 includes a second connecting portion 130 to be connected to the terminal 90. The second connecting portion 130 is provided on an end part opposite to the first connecting portion 120 in the longitudinal direction of the wire 110. In the second connecting portion 130, an end part of the core wire 111 (see FIG. 2) is connected to the terminal 90 as in the first connecting portion 120.

The three or more wires 110 are provided side by side along the first direction D1. Each wire 110 extends, for example, along the X axis. Each wire 110 extends, for example, straight along the X axis. For example, the respective wires 110 have the same length. In this specification, "same" means not only a perfectly identical case, but also a case where objects to be compared are slightly different in the range of manufacturing tolerances or assembling tolerances.

(Configuration of Connector 20)

As shown in FIG. 2, the connector 20 is mounted on a case 200 of the inverter. The case 200 has an opening 201.

As shown in FIG. 1, the connector 20 includes a housing 50 for holding the three or more terminals 30.

The housing 50 is integrally provided with a plate made of metal and projecting outward from the outer periphery of the housing 50. The plate 60 includes a plurality of mounting holes 61. Unillustrated bolts for mounting the plate 60 on the case 200 (see FIG. 2) are inserted into the respective insertion holes 61. By mounting the plate 60 on the case 200, the connector 20 is mounted on the case 200.

(Configuration of Housing 50)

The housing 50 includes, for example, a tubular portion 51 having a tubular shape and a holding portion 52 for holding the plurality of terminals 30. The housing 50 is, for example, a single component in which the tubular portion 51 and the holding portion 52 are integrally formed. The housing 50 is, for example, made of a resin material having an insulating property.

As shown in FIG. 2, the tubular portion 51 includes an opening 53 penetrating therethrough. A penetration direction of the opening 53 is, for example, a direction along the Z axis. As shown in FIG. 1, the opening 53 has, for example, an oval shape.

The holding portion 52 projects radially outwardly of the tubular portion 51 from the tubular portion 51. The holding portion 52 projects, for example, downward in FIG. 1 from the tubular portion 51 toward the wires 110. The holding portion 52 is, for example, provided at a position deviated from a center of the tubular portion 51 in the first direction D1. For example, a center of the holding portion 52 in the first direction D1 is deviated from the center of the tubular portion 51 in the first direction D1 in one direction (leftward direction in FIG. 1 in this embodiment) along the first direction D1.

The holding portion 52 holds parts of the terminals 30 and parts of the wires 110 including the first connecting portions 120. For example, the plurality of terminals 30 connected to the plurality of wires 110 and the housing 50 are integrated by insert molding. A part of each terminal 30 and each first connecting portion 120 are, for example, embedded in the holding portion 52.

As shown in FIG. 2, a groove 54 surrounding the opening 53 is provided in a part of the housing 50 facing the case 200. A ring-shaped sealing member 55 for sealing between the housing 50 and the case 200 is provided in the groove 54.

A guide portion 56 projecting, for example, in a direction away from the tubular portion 51, specifically toward the case 200, is provided in the part of the housing 50 facing the case 200. The guide portion 56 is, for example, inserted into an opening 201 of the case 200 along the inner peripheral surface of the opening 201. The guide portion 56 has a guide function of guiding the terminals 30 into the opening 201 in mounting the housing 50 on the case 200.

(Configuration of Terminals 30)

As shown in FIG. 1, each terminal 30 projects in a second direction D2 intersecting the first direction D1 from the holding portion 52 toward the inside of the opening 53. The second direction D2 of this embodiment is a direction along the X axis and orthogonal to the first direction D1.

Each terminal 30 includes a wire connecting portion 31, a terminal connecting portion 32 and an intermediate portion 33 provided between the wire connecting portion 31 and the terminal connecting portion 32. Each terminal 30 is a single component in which the wire connecting portion 31, the terminal connecting portion 32 and the intermediate portion 33 are integrally formed. Each terminal 30 is, for example, formed of a metal material such as copper, copper alloy, aluminum, aluminum alloy or stainless steel. Note that each terminal 30 has a width extending in the first direction D1. That is, the first direction D1 coincides with a width direction of each terminal 30. Further, a longitudinal direction of each terminal 30 is a direction orthogonal to the width direction of each terminal 30 and is an arrangement direction of the wire connecting portion 31, the intermediate portion 33 and the terminal connecting portion 32.

As shown in FIG. 2, the first connecting portion 120 of the wire 110 is electrically connected to each wire connecting portion 31. The core wire 111 exposed from the insulation coating 112 is joined to the wire connecting portion 31. Crimping, welding such as ultrasonic welding or laser welding, or another known joining method can be used as a joining method for the wire connecting portion 31 and the core wire 111.

As shown in FIG. 1, each wire connecting portion 31 includes a bent portion 34 bent in a direction intersecting both the first direction D1 and the second direction D2 on an XY plane. A bending amount of the bent portion 34 is set according to a deviation amount between the center of the tubular portion 51 in the first direction D1 and that of the holding portion 52 in the first direction D1.

As shown in FIG. 2, a first end part 31A in the longitudinal direction of the wire connecting portion 31 connected to the intermediate portion 33 projects into the opening 53. Here, each wire connecting portion 31 is covered from a part joined to the core wire 111 to the bent portion 34, for example, by the housing 50. Further, the first end part 31A of the wire connecting portion 31 projects toward the inside of the opening 53 from the inner peripheral surface of the tubular portion 51 and is exposed from the tubular portion 51 and the holding portion 52.

As shown in FIG. 2, the intermediate portion 33 is, for example, plate-like. The intermediate portion 33 is bent from the first end part 31A of the wire connecting portion 31 and extends toward the opening 201 of the case 200 along a third direction D3. The third direction D3 of this embodiment is a direction along the Z axis and orthogonal to both the first direction D1 (see FIG. 1) and the second direction D2. The third direction D3 of this embodiment coincides with the penetration direction of the opening 53. The intermediate portion 33 projects, for example, from the opening 53. A longitudinal part of the intermediate portion 33 projects, for example, in the third direction D3 from the opening 53. For example, a longitudinal end part of the intermediate portion 33 connected to the terminal connecting portion 32 is located outside the opening 53 and inside the opening 201 of the case 200.

The terminal connecting portion 32 is provided on an end part opposite to the wire connecting portion 31 in the longitudinal direction of the terminal 30. The terminal connecting portion 32 is, for example, plate-like. The terminal connecting portion 32 is bent from the intermediate portion 33 and extends toward a side opposite to the wire connecting portion 31 in the second direction D2. The terminal connecting portion 32 extends, for example, in the second direction D2. The terminal connecting portion 32 is, for example, located outside the opening 53 and inside the opening 201 of the case 200.

The terminal connecting portion 32 includes an insertion hole 35 penetrating through the terminal connecting portion 32 in the third direction D3. The insertion hole 35 has, for example, a circular shape. An axial direction in which a center axis of the insertion hole 35 extends coincides with the penetration direction of the opening 53. In a plan view from the third direction D3, the insertion hole 35 entirely overlaps the opening 53.

Each terminal 30 is, for example, formed into a crank shape. Each terminal 30 has, for example, a cranked cross-sectional shape cut by an XZ plane. Each terminal 30 is, for example, formed into the crank shape by the wire connecting portion 31 extending in the second direction D2, the intermediate portion 33 bent from the wire connecting portion 31 and extending in the third direction D3 and the terminal connecting portion 32 bent from the intermediate portion 33 and extending in the second direction D2.

The plurality of terminals 30 are respectively electrically connected to a plurality of mating terminals 202 made of metal and provided inside the opening 201 of the case 200. Although not shown, the plurality of mating terminals 202 are arranged side by side along the first direction D1 (see FIG. 1), similarly to the plurality of terminals 30. The mating terminal 202 includes a through hole 203 penetrating therethrough in the third direction D3. The through hole 203 has, for example, a circular shape. A nut 204 communicating with the through hole 203 is, for example, attached to the mating terminal 202. By screwing a bolt 205 inserted through the insertion hole 35 of the terminal 30 and the through hole 203 of the mating terminal 202 into the nut 204, the terminal 30 and the mating terminal 202 are fastened.

Figure 3:
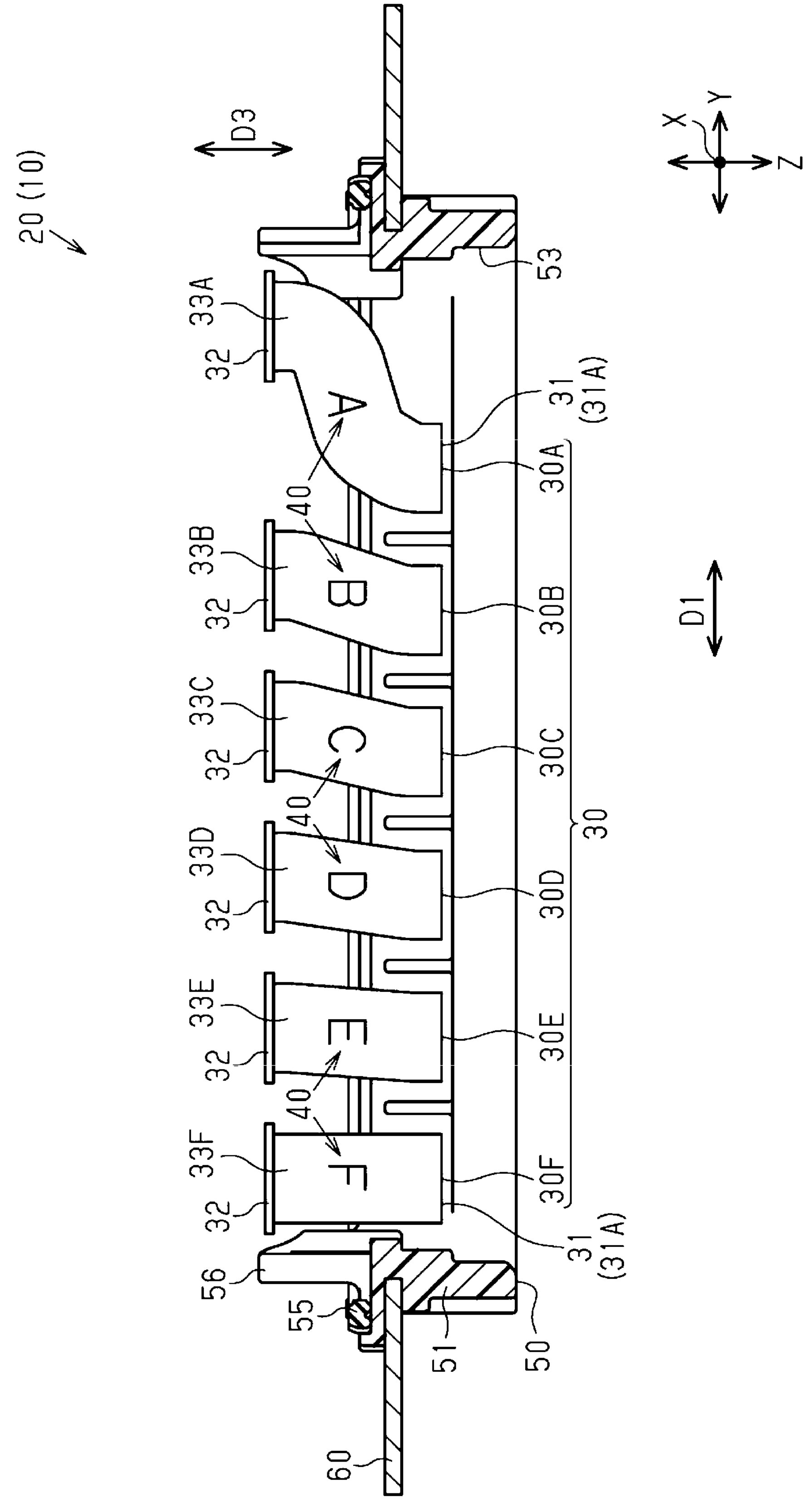
FIG. 3 is a schematic section (section along 3-3 in FIG. 1) showing the wiring harness of the embodiment.

As shown in FIG. 3, the three or more terminals 30 include a total of six terminals, i.e. terminals 30A, 30B, 30C, 30D, 30E and 30F. The six terminals 30A to 30F have mutually different shapes. The six terminals 30A to 30F are, for example, formed such that the intermediate portions 33 have mutually different shapes. Specifically, the intermediate portion 33A of the terminal 30A, the intermediate portion 33B of the terminal 30B, the intermediate portion 33C of the terminal 30C, the intermediate portion 33D of the terminal 30D, the intermediate portion 33E of the terminal 30E and the intermediate portion 33F of the terminal 30F are formed to have mutually different shapes. Each of the six intermediate portion 33A to 33F extends toward the end part of the terminal connecting portion 32 from the first end part 31A of the wire connecting portion 31 while being bent in a direction orthogonal to both the first direction D1 and the third direction D3. In the six intermediate portions 33A to 33F, bending amounts in the direction orthogonal to the first direction D1 and the third direction D3 are mutually different.

As shown in FIG. 1, in the six terminals 30A to 30F, structures other than the intermediate portions 33, i.e. the structures of the wire connecting portions 31 and the terminal connecting portions 32 are, for example, formed to have the same shape and the same size. For example, in the six terminals 30A to 30F, the bending amounts of the bent portions 34 of the wire connecting portions 31 are set to be equal. In other words, the six terminals 30A to 30F are mutually different, for example, only in the structures of the intermediate portions 33. Further, the wire connecting portions 31 in the six terminals 30A to 30F are all provided at the same position in the second direction D2. The terminal connecting portions 32 in the six terminals 30A to 30F are all provided at the same position in the second direction D2.

(Configuration of Identifying Portions 40)

As shown in FIG. 3, the six terminals 30A to 30F include identifying portions 40 for mutual identification. The identifying portions 40 are, for example, provided at visible positions. The identifying portions 40 are, for example, provided at positions visible from the outside of the housing 50 with the terminals 30A to 30F held by the housing 50. The identifying portions 40 are, for example, provided in parts of the terminals 30A to 30F not covered by the housing 50. The identifying portions 40 are, for example, provided in the intermediate portions 33A to 33F. For example, the identifying portion 40 is provided on the surface of the intermediate portion 33A to 33F extending along the third direction D3 coinciding with the penetration direction of the opening 53, out of each terminal 30A to 30F. As shown in FIG. 2, the identifying portion 40 is provided on a surface facing in the second direction D2, out of the surface of the intermediate portion 33. The identifying portion 40 is, for example, provided on the surface facing in the second direction D2 and facing toward the terminal connecting portion 32, out of the surface of the intermediate portion 33. As shown in FIG. 3, the identifying portion 40 is, for example, provided in a part of the intermediate portion 33A to 33F projecting to the outside of the opening 53. The identifying portion 40 is, for example, formed by printing on the surface of the intermediate portion 33A to 33F. The identifying portions 40 of this embodiment are symbols such as "A", "B", "C", "D", "E" and "F" respectively printed on the surfaces of the intermediate portions 33A to 33F. Note that the symbols to be printed as the identifying portions 40 are not particularly limited. The symbols to be printed as the identifying portions 40 are preferably, for example, symbols having sequentiality. For example, symbols "1", "2", "3", "4", "5" and "6" may be respectively printed as the identifying portions 40 on the surfaces of the intermediate portions 33A to 33F.

(Configuration of Cover Unit 70)

Figure 4:
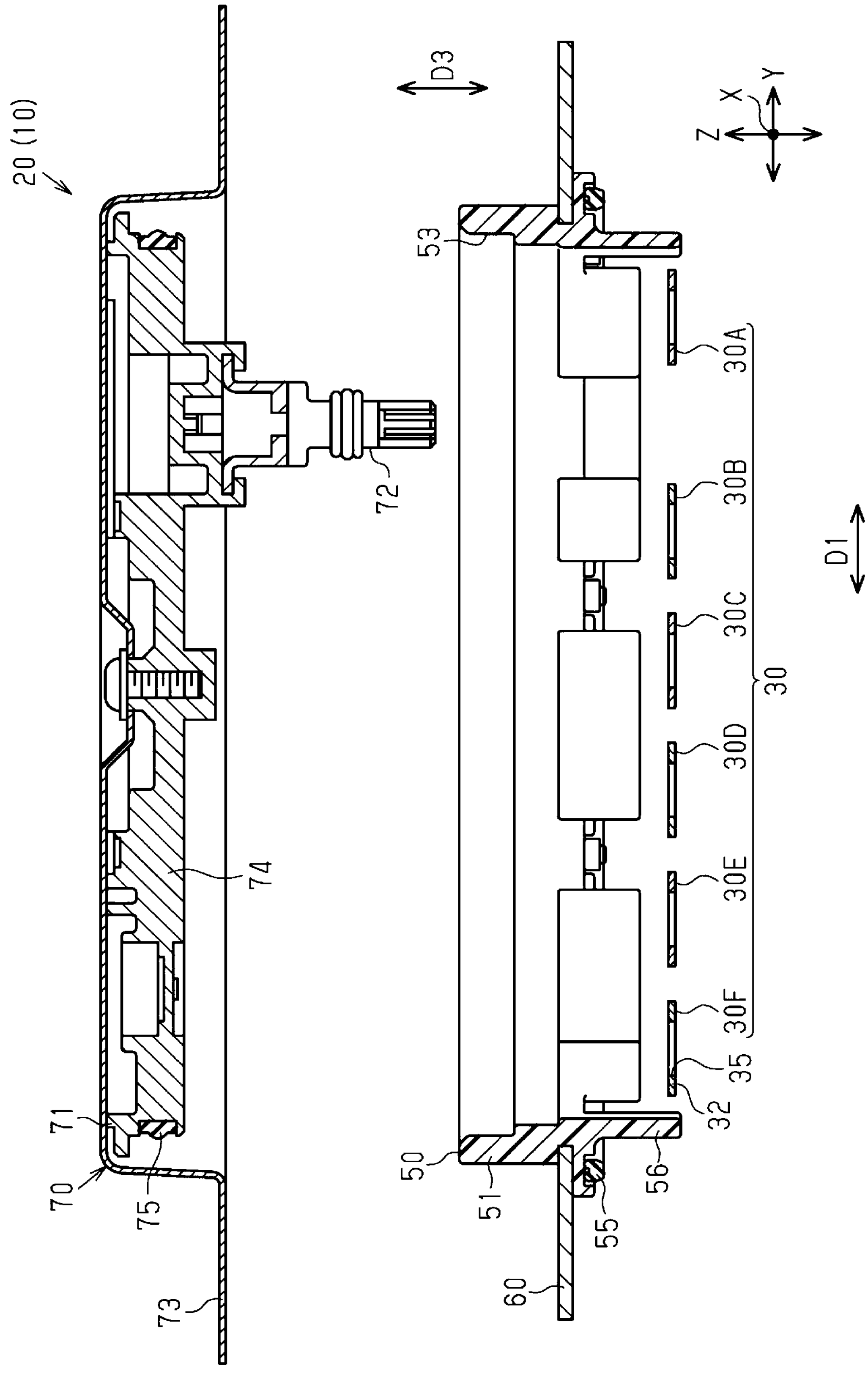
FIG. 4 is a schematic section showing a connector of the embodiment.

As shown in FIG. 4, the connector 20 includes, for example, a cover unit 70 to be mounted on the housing 50. The cover unit 70 includes a cover 71, an interlock connector 72 and an electromagnetic shielding cover 73.

The cover 71 closes one end side of the opening 53 in the third direction D3. The cover 71 closes, for example, a side of the opening 53 opposite to a side facing the case 200 (see FIG. 2). The cover 71 includes, for example, a fitting portion 74 to be fit into the opening 53. The fitting portion 74 closes the opening 53. A sealing member 75 is mounted on the outer peripheral surface of the fitting portion 74. The sealing member 75 seals between the outer peripheral surface of the fitting portion 74 and the inner peripheral surface of the opening 53. The cover 71 is, for example, made of a resin material having an insulating property. The cover 71 is, for example, fixed to the electromagnetic shielding cover 73 by screws or the like.

The interlock connector 72 is for electrically detecting whether or not the connector 20 is connected to the case 200 (see FIG. 2) of the inverter as a connection object at a proper position. If the connector 20 is connected to the case 200 at the proper position, the interlock connector 72 is connected to an unillustrated standby connector provided inside the case 200. An interlock circuit is constituted by the interlock connector 72 and the standby connector. If the interlock connector 72 is connected to the standby connector, the connector 20 and the inverter become electrically conductive.

The interlock connector 72 projects from the fitting portion 74 toward the opening 53. The interlock connector 72 extends from the fitting portion 74 toward the terminals 30A to 30F in the third direction D3. The interlock connector 72 is, for example, arranged between the terminals 30A and 30B in the first direction D1. When the cover unit 70 is mounted on the housing 50, the interlock connector 72 is provided in parallel with the six terminals 30A to 30F in the first direction D1.

The electromagnetic shielding cover 73 is, for example, made of a conductor such as a metal. The electromagnetic shielding cover 73 covers a side of the housing 50 opposite to a side facing the case 200 (see FIG. 2). The electromagnetic shielding cover 73 is, for example, fixed to the plate 50 by fastening bolts.

(Configuration of Connector 80)

As shown in FIG. 1, the connector 80 is mounted on a case of the unillustrated motor. The connector 80 includes a housing 100 for holding the three or more terminals 90. The connector 80 includes, for example, six terminals 90. The six terminals 90 are provided side by side along the first direction D1. The respective six terminals 90 have, for example, the same shape.

(Configuration of Housing 100)

The housing 100 includes, for example, a tubular portion 101 having a tubular shape and a holding portion 102 for holding the plurality of terminals 90. The housing 100 is, for example, a single component in which the tubular portion 101 and the holding portion 102 are integrally formed. The housing 100 is, for example, made of a resin material having an insulating property.

The tubular portion 101 includes an opening 103 penetrating therethrough. A penetration direction of the opening 103 is, for example, a direction along the Z axis. The opening 103 has, for example, an oval shape.

The holding portion 102 projects radially outwardly of the tubular portion 101 from the tubular portion 101. The holding portion 102 projects, for example, upward in FIG. 1 from the tubular portion 101 toward the wires 110. The holding portion 102 holds parts of the terminals 90 and parts of the wires 110 including the second connecting portions 130. The plurality of terminals 90 connected to the plurality of wires 110 and the housing 100 are integrated by insert molding. A part of each terminal 90 and each second connecting portion 130 are, for example, embedded in the holding portion 102.

(Configuration of Terminals 90)

Each terminal 90 projects from the holding portion 102 toward the inside of the opening 103. Each terminal 90 extends in the second direction D2 intersecting the first direction D1.

Each terminal 90 includes a wire connecting portion 91 and a terminal connecting portion 92. Each terminal 90 is a single component in which the wire connecting portion 91 and the terminal connecting portion 92 are integrally formed. Each terminal 90 is, for example, formed of a metal material such as copper, copper alloy, aluminum, aluminum alloy or stainless steel. Note that each terminal 90 has a width extending in the first direction D1. That is, the first direction D1 coincides with a width direction of each terminal 90. Further, a longitudinal direction of each terminal 90 is a direction orthogonal to the width direction of each terminal 90 and an arrangement direction of the wire connecting portion 91 and the terminal connecting portion 92.

The second connecting portion 130 of the wire 110 is electrically connected to each wire connecting portion 91. The core wire 111 (see FIG. 2) of the wire 110 is joined to the wire connecting portion 91.

The terminal connecting portion 92 is, for example, plate-like. The terminal connecting portion 92 projects, for example, from the inner peripheral surface of the tubular portion 101 toward the inside of the opening 103 and is exposed from the housing 100.

The terminal connecting portion 92 includes an insertion hole 93 penetrating therethrough in a direction along the Z axis. The insertion hole 93 has, for example, a circular shape. An axial direction in which a center axis of the insertion hole 93 extends coincides with the penetration direction of the opening 103. In a plan view from the direction along the Z axis, the insertion hole 93 entirely overlaps the opening 103.

The plurality of terminals 90 are electrically connected to a plurality of mating terminals made of metal and provided inside the case of the unillustrated motor. The terminal connecting portion 92 of the terminal 90 and the mating terminal are, for example, fastened by an unillustrated bolt.

(Specific Structure of Wiring Harness 10)

Figure 5:
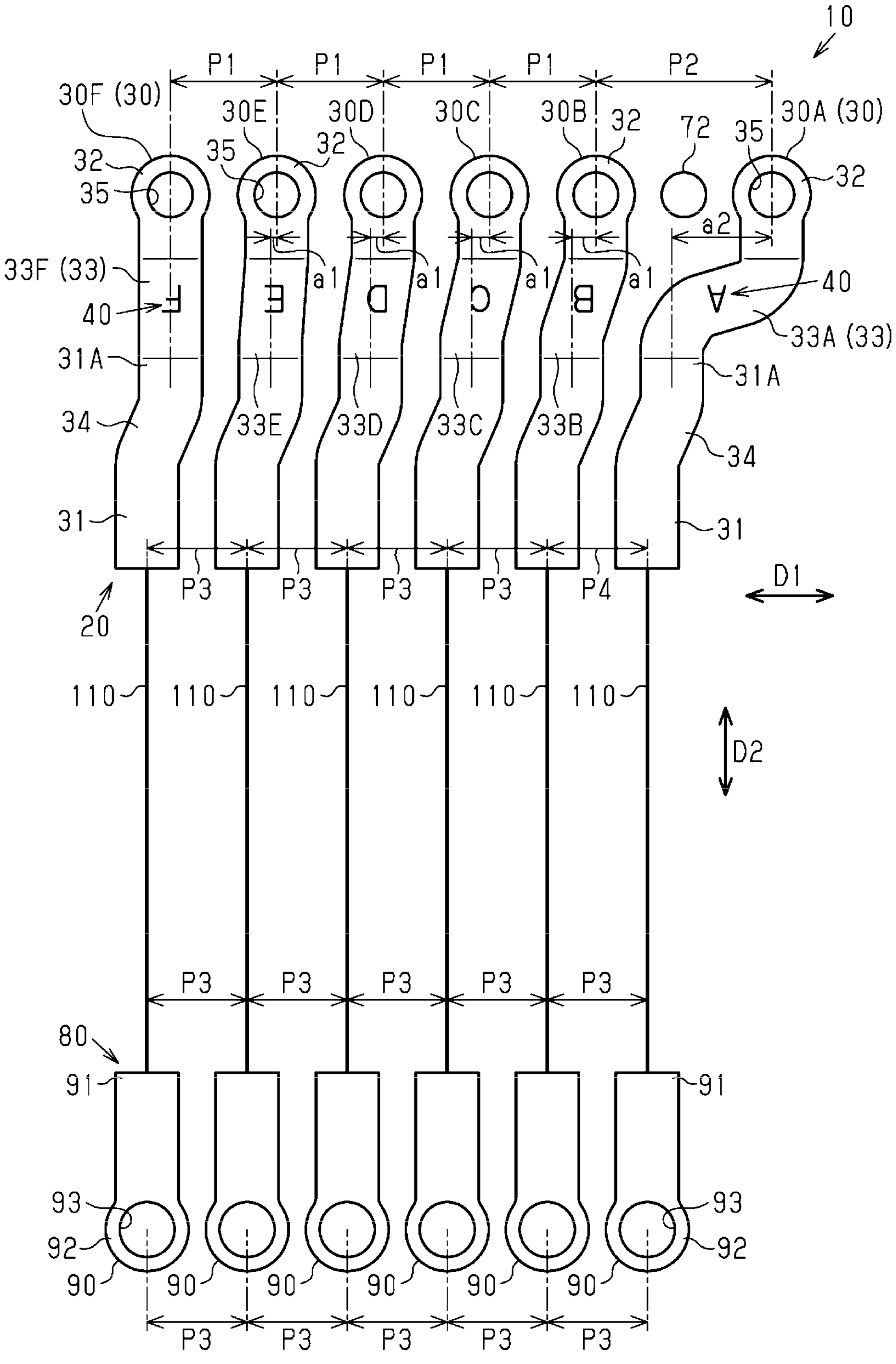
FIG. 5 is a schematic diagram showing the wiring harness of the embodiment.

Next, the configuration of the wiring harness 10 is more specifically described with reference to FIG. 5. FIG. 5 is a schematic diagram showing a positional relationship of the three or more terminals 30, the three or more terminals 90 and the three or more wires 110.

The six terminals 30A to 30F are provided in parallel along the first direction D1. The terminal connecting portions 32 (first terminal connecting portions) in five terminals 30B to 30F are arranged at intervals P1 along the first direction D1. Here, the intervals P1 are intervals between the terminal connecting portions 32 of the terminals 30B to 30F adjacent in the first direction D1. The intervals P1 are, for example, distances along the first direction D1 between widthwise centers of the terminal connecting portions 32 in the terminals 30B to 30F adjacent in the first direction D1. At this time, the widthwise center of the terminal connecting portion 32 coincides with the position of the center axis of the insertion hole 35 in the first direction D1. In this embodiment, the terminal connecting portions 32 in the five terminals 30B to 30F are arranged at regular intervals P1 along the first direction D1. That is, in the five terminals 30B to 30F, all of two or more (here, four) intervals P1 are set to an equal distance. Specifically, the interval P1 between the terminal connecting portions 32 of the terminals 30B and 30C, the interval P1 between the terminal connecting portions 32 of the terminals 30C and 30D, the interval P1 between the terminal connecting portions 32 of the terminals 30D and 30E and the interval P1 between the terminal connecting portions 32 of the terminals 30E and 30F are all an equal distance.

The interlock connector 72 is provided between the terminal connecting portion 32 of the terminal 30A and the terminal connecting portion 32 of the terminal 30B adjacent in the first direction D1. The terminal connecting portion 32 of the terminal 30A is provided away from the interlock connector 72 so as not to interfere with the interlock connector 72. Thus, the terminal connecting portion 32 (second terminal connecting portion) of the terminal 30A (second terminal) is provided at an interval P2 larger than the interval P1 from the terminal connecting portion 32 (first terminal connecting portion) of the terminal 30B adjacent in the first direction D1. Here, the interval P2 is an interval between the terminal connecting portions 32 of the terminals 30A, 30B adjacent in the first direction D1. The interval P2 is, for example, a distance along the first direction D1 between widthwise centers of the terminal connecting portions 32 in the terminals 30A, 30B adjacent in the first direction D1. The interval P2 is larger than the intervals P1 by as much as the interlock connector 72 is avoided.

The wire connecting portions 31 (first wire connecting portions) in the five terminals 30B to 30F are arranged at intervals P3 along the first direction D1. Here, the intervals P3 are intervals between the wire connecting portions 31 of the terminals 30B to 30F adjacent in the first direction D1. The intervals P3 are, for example, distances along the first direction D1 between widthwise centers of the wire connecting portions 31 in the terminals 30B to 30F adjacent in the first direction D1. In this embodiment, the wire connecting portions 31 in the five terminals 30B to 30F are arranged at regular intervals P3 along the first direction D1. That is, in the five terminals 30B to 30F, all of two or more (here, four) intervals P3 are set to an equal distance. Specifically, the interval P3 between the wire connecting portions 31 of the terminals 30B and 30C, the interval P3 between the wire connecting portions 31 of the terminals 30C and 30D, the interval P3 between the wire connecting portions 31 of the terminals 30D and 30E and the interval P3 between the wire connecting portions 31 of the terminals 30E and 30F are all an equal distance.

The wire connecting portion 31 (second wire connecting portion) of the terminal 30A is provided at an interval P4 from the wire connecting portion 31 (first wire connecting portion) of the terminal 30B adjacent in the first direction D1. Here, the interval P4 is an interval between the wire connecting portions 31 of the terminals 30A, 30B adjacent in the first direction D1. The interval P4 is, for example, a distance along the first direction D1 between a widthwise center of the wire connecting portion 31 of the terminal 30A and that of the wire connecting portion 31 of the terminal 30B. In this embodiment, the interval P4 is a distance equal to the intervals P3. That is, the interval P4 between the wire connecting portion 31 of the terminal 30A and the wire connecting portion 31 of the terminal 30B adjacent in the first direction D1 is an interval equal to the intervals P3. Thus, the wire connecting portions 31 in the six terminals 30A to 30F are arranged at regular intervals P3 along the first direction D1.

In this embodiment, the wire connecting portions 31 in the six terminals 30A to 30F are formed to have the same shape and the same size. Further, the positions of the wire connecting portions 31 of the six terminals 30A to 30F are aligned in the second direction D2. Thus, the intervals P3, P4 are an equal distance at any position in the longitudinal direction of the wire connecting portions 31. That is, the intervals P3, P4 in the first end parts 31A of the six wire connecting portions 31 to be connected to the intermediate portions 33 and the intervals P3, P4 in parts of the six terminal connecting portion 31 to be connected to the wires 110 are an equal distance.

The intervals P3, P4 are different from the intervals P1. In this embodiment, the intervals P3, P4 are smaller than the intervals P1. The intervals P3, P4 are different from the interval P2. In this embodiment, the intervals P3, P4 are smaller than the interval P2. In each of the five terminals 30B to 30F, the widthwise center of the wire connecting portion 31 and that of the terminal connecting portion 32 are deviated in the first direction D1 due to a difference between the intervals P1 and P3. Specifically, in each of the five terminals 30B to 30F, the widthwise center of the first end part 31A of the wire connecting portion 31 and that in the terminal connecting portion 32 are deviated in position in the first direction D1 by a deviation amount a1.

In this embodiment, the deviation amount a1 in the first direction D1 between the wire connecting portion 31 and the terminal connecting portion 32 in the five terminals 30B to 30F changes in an arithmetic progression. In particular, in the terminal 30F, the widthwise center of the first end part 31A of the wire connecting portion 31 and that of the terminal connecting portion 32 coincide. That is, in the terminal 30F, the deviation amount a1 in the first direction D1 between the first end part 31A of the wire connecting portion 31 and the terminal connecting portion 32 is 0. In the terminal 30E adjacent to the terminal 30F, the widthwise center of the first end part 31A of the wire connecting portion 31 and that of the wire connecting portion 32 are deviated in position in the first direction D1 by a distance corresponding to the difference between the intervals P1 and P3. That is, the deviation amount a1 in the terminal 30E is a distance difference between the intervals P1 and P3, i.e. (P1−P3). In the terminal 30D adjacent to the terminal 30E, the widthwise center of the first end part 31A of the wire connecting portion 31 and that of the wire connecting portion 32 are deviated in position in the first direction D1 by twice the difference between the intervals P1 and P3. That is, the deviation amount a1 in the terminal 30D is twice the distance difference between the intervals P1 and P3, i.e. (P1−P3)×2. Similarly, the deviation amount a1 in the terminal 30C adjacent to the terminal 30D is three times as much as the distance difference between the intervals P1 and P3, i.e. (P1−P3)×3. The deviation amount a1 in the terminal 30B adjacent to the terminal 30C is four times as much as the distance difference between the intervals P1 and P3, i.e. (P1−P3)×4. In this way, with the terminal 30F as a reference, the deviation amount a1 increases by the difference (P1−P3) between the intervals P1 and P3 toward the terminal 30E, the terminal 30D, the terminal 30C and the terminal 30B. That is, in the five terminals 30B to 30F, a change amount of the deviation amount a1 between the terminals 30B to 30F adjacent in the first direction D1 is the difference (P1-P3) between the intervals P1 and P3. Here, the change amount of the deviation amount a1 between the terminals 30B to 30F adjacent in the first direction D1 is, for example, smaller than the width of each terminal 30B to 30F. For example, the change amount of the deviation amount a1 between the terminals 30B to 30F adjacent in the first direction D1 is, for example, larger than half the width of each terminal 30B to 30F.

The terminal 30A is provided at the interval P2 larger than the interval P1 from the adjacent terminal 30B as described above. However, the interval P4 between the wire connecting portion 31 of the terminal 30A and the wire connecting portion 31 of the terminal 30B adjacent in the first direction D1 is equal to the interval P3. Thus, in the terminal 30A, the widthwise center of the first end part 31A of the wire connecting portion 31 and that of the terminal connecting portion 32 are deviated in position in the first direction D1 by a deviation amount a2. For example, the deviation amount a2 in the terminal 30A is a total distance of the deviation amount a1 in the terminal 30B, i.e. four times as much as the distance difference between the intervals P1 and P3 (P1–P3)×4, and a difference (P2–P4) between the intervals P2 and P4.

The six intermediate portions 33A to 33F are formed to have mutually different shapes according to the differences between the intervals P1 and P3. Five intermediate portions 33B to 33F (first intermediate portions) are formed to have mutually different shapes according to the deviation amounts a1 in the corresponding terminals 30B to 30F. The intermediate portion 30A (second intermediate portion) is formed to have a shape different from the intermediate portions 33B to 33F according to the deviation amount a2 in the corresponding terminal 30A. The five intermediate portions 33B to 33F are, for example, formed to have a shape extending in a direction intersecting the first direction D1 to absorb the deviation amounts a1 in the corresponding terminals 30B to 30F. The intermediate portion 33B to 33F is, for example, formed to have a bent shape to extend in the first direction D1 by the deviation amount a1 in the corresponding terminal 30B to 30F. In this way, a bending amount in the intermediate portion 33B to 33F is set according to the deviation amount a1 in the corresponding terminal 30B to 30F, i.e. the difference between the intervals P1 and P3. That is, an angle formed by an extending direction of the intermediate portion 33B to 33F and the first direction D1 is set according to the deviation amount a1 in the corresponding terminal 30B to 30F. Thus, in the intermediate portion 33B to 33F, the bending amount increases as the deviation amount a1 in the corresponding terminal 30B to 30F increases. That is, in the intermediate portions 33B to 33F, the bending amount gradually increases in the order of the intermediate portion 33F→the intermediate portion 33E→the intermediate portion 33D→the intermediate portion 33C→the intermediate portion 33B. Here, if the change amount of the deviation amount a1 between the terminals 30B to 30F adjacent in the first direction D1 is small, a difference between the bending amounts of the terminals 30B to 30F adjacent in the first direction D1 becomes smaller. Thus, if the change amount of the deviation amount a1 is small, a degree of shape change between the terminals 30B to 30F adjacent in the first direction D1 becomes smaller. If the shape differences in the five intermediate portions 33B to 33F become smaller in this way, identification only by the shape differences of those five intermediate portions 33B to 33F becomes difficult. Accordingly, in this embodiment, the respective terminals 30B to 30F are provided with the identifying portions 40 for identifying the terminals 30B to 30F from one another.

The intermediate portion 33A is formed to have a shape extending in a direction intersecting the first direction D1 to absorb the deviation amount a2 in the terminal 30A. The intermediate portion 33A is, for example, formed to have a bent shape to extend in the first direction D1 by the deviation amount a2. A bending amount in the intermediate portion 33A is largest among the intermediate portions 33A to 33F.

The six wires 110 are, for example, provided side by side at the intervals P3 along the first direction D1. Here, the intervals P3 between the wires 110 are intervals between adjacent ones of the wires 110 in the first direction D1. The intervals P3 between the wires 110 are, for example, distances along the first direction D1 between center axes of the wires 110 adjacent in the first direction D1. In this embodiment, the six wires 110 are provided side by side at regular intervals P3 along the first direction D1.

The six terminals 90 are, for example, provided side by side at the intervals P3 along the first direction D1. Here, the intervals P3 between the terminals 90 are intervals between the terminals 90 adjacent in the first direction D1. The intervals P3 between the terminals 90 are, for example, distances along the first direction D1 between widthwise centers of the terminals 90 adjacent in the first direction D1. In this embodiment, the six terminals 90 are provided side by side at the regular intervals P3 along the first direction D1. In this way, the six wires 110 and the six terminals 90 are arranged at the same intervals P3 as the wire connecting portions 31 of the six terminals 30A to 30F in the first direction D1. Further, the positions of the wire connecting portions 31 of the six terminals 30A to 30F are aligned in the second direction D2. The positions of the six terminals 90 are aligned in the second direction D2. Thus, lengths of the respective six wires 110 can be set equal.

Next, functions and effects of this embodiment are described.

(1) Each of the three or more terminals 30B to 30F includes the wire connecting portion 31, the terminal connecting portion 32 and the intermediate portion 33. The terminal connecting portions 32 in the three or more terminals 30B to 30F are arranged at the intervals P1 along the first direction D1. The wire connecting portions 31 in the three or more terminals 30B to 30F are arranged at the intervals P3 different from the intervals P1 along the first direction D1. Further, the three or more intermediate portions 33B of 33F are formed to have mutually different shapes according to the differences between the intervals P1 and P3. Thus, the three or more terminals 30B to 30F have mutually different shapes. In this case, if the three or more terminals 30B to 30F are identified based only on the shape differences of the intermediate portions 33B to 33F, such as when the connector 20 is assembled, a lot of time is required for identification. In this way, the assembling workability of the connector 20 is reduced. In contrast, in the connector 20 of this embodiment, the identifying portions 40 for mutual identification are provided in the three or more terminals 30B to 30F. In this way, even if the three or more terminals 30B to 30F have mutually different shapes, the three or more terminals 30B to 30F can be easily identified based on the identifying portions 40. Thus, a time required to identify the three or more terminals 30B to 30F can be shortened and the assembling workability of the connector 20 can be improved.

(2) The terminal connecting portions 32 in the three or more terminals 30B to 30F are arranged at the regular intervals P1, and the wire connecting portions 31 in the three or more terminals 30B to 30F are arranged at the regular intervals P3. Further, the three or more terminals 30B to 30F are formed to have mutually different shapes according to the deviation amounts a1 in the first direction D1 between the wire connecting portions 31 and the terminal connecting portions 32. Thus, the differences between the intervals P1 and P3 can be absorbed by the respective shapes of the intermediate portions 33B to 33F. For example, the differences between the intervals P1 and P3 can be absorbed only by the structures of the terminals 30B to 30F, for example, without setting the lengths of the wires 110 to be connected to the terminals 30B to 30F to mutually different lengths.

(3) The differences between the intervals P1 and P3 are smaller than the width of each terminal 30B to 30F. Thus, the change amount of the deviation amount a1 in the first direction D1 between the wire connecting portion 31 and the terminal connecting portion 32, specifically, the change amount of the deviation amount a1 in the terminals 30B to 30F adjacent in the first direction D1, is smaller than the width of each terminal 30B to 30F. In this way, the degree of shape change in the intermediate portions 33B to 33F adjacent in the first direction D1 becomes smaller. As a result, it becomes difficult to identify the three or more terminals 30B to 30F only by the shape differences of the intermediate portions 33B to 33F. Thus, as the differences between the intervals P1 and P3 decrease, the effect brought about by providing the identifying portion 40 in each terminal 30B to 30F, i.e. the effect described in (1) described above more notably appears.

(4) The identifying portions 40 are provided in the parts of the terminals 30B to 30F not covered by the housing 50. Thus, for example, also in a state where the terminals 30B to 30F are held by the housing 50, the identifying portions 40 can be confirmed. Therefore, also in the state where the terminals 30B to 30F are held by the housing 50, the three or more terminals 30B to 30F can be easily identified based on the identifying portions 40.

(5) The identifying portions 40 are provided on the surfaces of the intermediate portions 33B to 33F extending along the penetration direction of the opening 53. Thus, for example, also in the state where the terminals 30B to 30F are held by the housing 50, the identifying portions 40 are easily visually confirmed through the opening 53. Therefore, the three or more terminals 30B to 30F can be easily identified based on the identifying portions 40.

(6) The identifying portions 40 are formed by printing on the surfaces of the terminals 30B to 30F. Thus, the interference of, for example, the fingers of a worker, who is assembling the connector 20, with the identifying portions 40 can be suppressed. In this way, the assembling workability of the connector 20 can be improved. Further, an increase in the sizes of the terminals 30B to 30F due to the provision of the identifying portions 40 can be suitably suppressed.

(7) The interlock connector 72 is provided between the terminals 30A and 30B in the first direction D1. At this time, the interval P2 between the terminal connecting portion 32 of the terminal 30A and the terminal connecting portion 32 of the terminal 30B adjacent in the first direction D1 is set larger than the intervals P1. In this way, the interlock connector 72 can be suitably arranged between the terminal connecting portion 32 of the terminal 30A and the terminal connecting portion 32 of the terminal 30B while the interference of the terminal connecting portion 32 of the terminal 30A with the interlock connector 72 is suitably suppressed.

(8) Similarly to the terminals 30B to 30F, the identifying portion 40 is also provided in the terminal 30A. Thus, the terminals 30A to 30F can be easily identified based on the identifying portions 40.

(9) Five terminals 30B to 30F are provided side by side at the intervals P1. According to this configuration, since the five terminals 30B to 30F having mutual different shapes are provided, the types of components in the wiring harness 10 increase. In this case, it becomes cumbersome to identify the five terminals 30B to 30F. Thus, as the number of the terminals 30 increases, the effect brought about by providing the identifying portions 40 in the respective terminals 30, i.e. the effect of (1) described above more notably appears.

(10) The respective wires 110 have the same length. Thus, an increase in the types of the components in the wiring harness 10 can be suppressed as compared to the case where the respective wires 110 have different lengths.

Other Embodiments

The above embodiment can be modified and carried out as follows. The above embodiment and the following modifications can be carried out in combination without technically contradicting each other.

The formation position of the identifying portion 40 in the above embodiment is not particularly limited. For example, although the identifying portion 40 is provided in the part of each terminal 30 not covered by the housing 50 in the above embodiment, the formation position of the identifying portion 40 is not limited to this. For example, the identifying portion 40 may be provided in a part of each terminal 30 covered by the housing 50, e.g. in the wire connecting portion 31. Even in this case, the terminal 30 can be identified based on the identifying portion 40, for example, in a state before the terminal 30 is held by the housing 50. Thus, assembling workability in assembling the connector 20 can be improved. Further, the identifying portion 40 may be provided in the terminal connecting portion 32 of each terminal 30.

Although the identifying portion 40 is formed by printing on the surface of each terminal 30 in the above embodiment, there is no limitation to this. For example, if the identifying portions 40 are structured to be capable of identifying the three or more terminals 30 from each other, other structures are not particularly limited.

Figure 6:
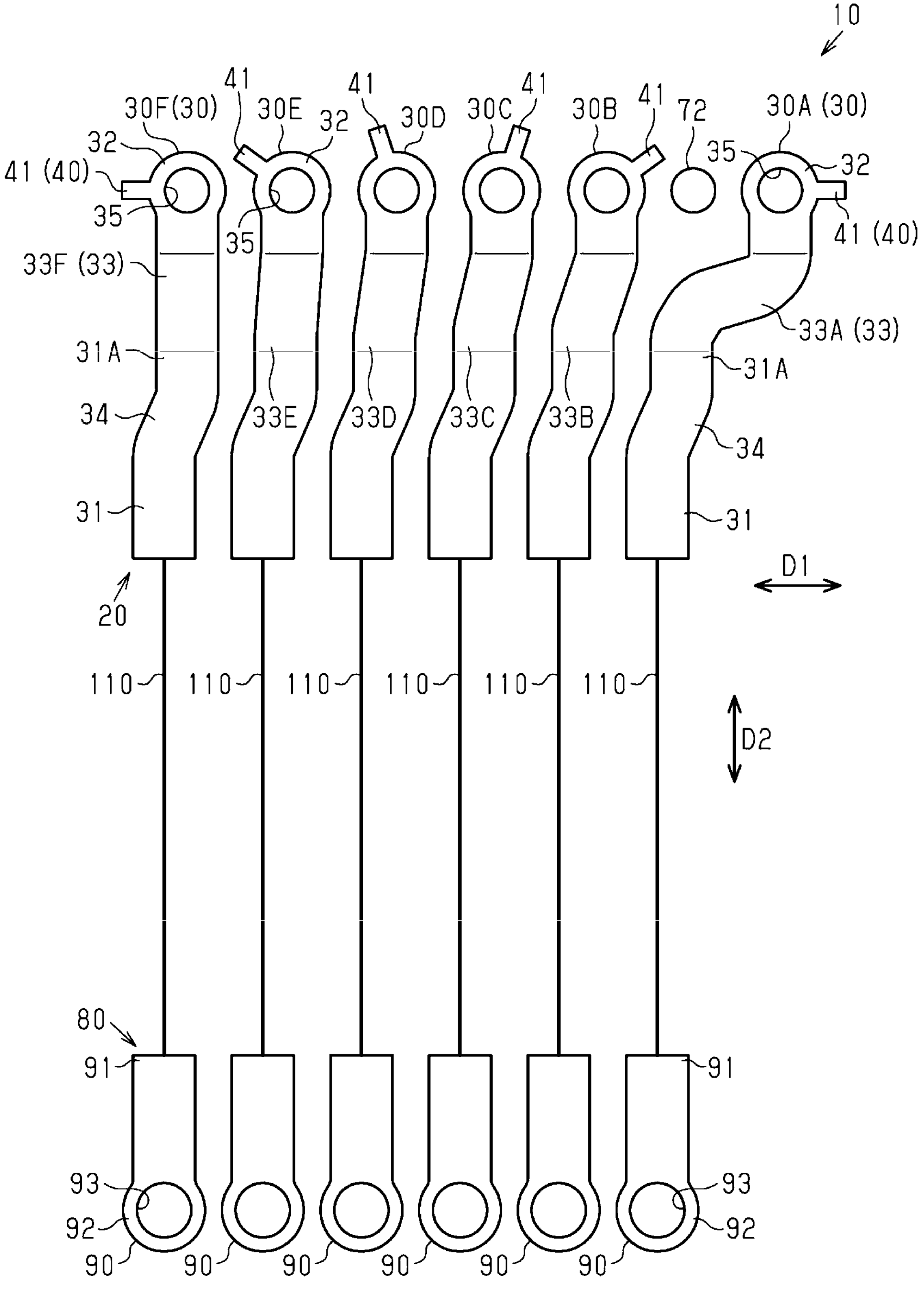
FIG. 6 is a schematic diagram showing a wiring harness of a modification.

For example, as shown in FIG. 6, the identifying portions 40 may be formed by projections 41 provided on the respective terminals 30. For example, the projection 41 is provided on the terminal connecting portion 32 of each terminal 30. The projections 40 are, for example, provided to project outward from mutually different positions of the outer side surfaces of the terminal connecting portions 32 in the terminal connecting portions 32 of the six terminals 30A to 30F. For example, each terminal connecting portion 32 is formed into a circular shape. The projections 41 project outward from positions mutually different in circumferential directions of the terminal connecting portions 32 in the terminal connecting portions 32 of the six terminals 30A to 30F. By providing such projections 41 on the respective terminals 30, the six terminals 30A to 30F can be easily identified based on the formation positions of the projections 41.

Although the identifying portions 40 are provided in all the terminals 30A to 30F in the above embodiment, there is no limitation to this. For example, the identifying portion of the terminal 30A may be omitted.

Although the wire connecting portions 31 of the six terminals 30A to 30F are formed to have the same shape and the same size in the above embodiment, there is no limitation to this. For example, the wire connecting portions 31 of the six terminals 30A to 30F may be formed to have mutually different shapes.

Although all the wire connecting portions 31 in the six terminals 30A to 30F are provided at the same position in the second direction D2 in the above embodiment, there is no limitation to this. For example, the terminal connecting portions 32 of the six terminals 30A to 30F may be provided at positions mutually different in the second direction D2.

Although the terminal connecting portions 32 in the six terminals 30A to 30F are formed to have the same shape and the same size in the above embodiment, there is no limitation to this. For example, the terminal connecting portions 32 in the six terminals 30A to 30F may be formed to have mutually different shapes.

Although all the terminal connecting portions 32 in the six terminals 30A to 30F are provided at the same position in the second direction D2 in the above embodiment, there is no limitation to this. For example, the terminal connecting portions 32 of the six terminals 30A to 30F may be provided at positions mutually different in the second direction D2.

Although the respective three or more wires 110 have a fixed length in the above embodiment, the respective three or more wires 110 may have mutually different lengths.

Although two or more intervals P1 are all an equal distance in the terminal connecting portions 32 of the thee or more terminals 30B to 30F, the two or more intervals P1 may be set to mutually different distances.

Although the two or more intervals P3 are all an equal distance in the wire connecting portions 31 of the thee or more terminals 30B to 30F, the two or more intervals P3 may be set to mutually different distances.

Although the intervals P1 are set larger than the intervals P3 in the above embodiment, the intervals P1 may be set smaller than the intervals P3.

The installation position of the interlock connector 72 in the above embodiment is not particularly limited. For example, the interlock connector 72 may be provided between the terminals 30B and 30C in the first direction D1. In this case, the interval between the terminal connecting portion 32 of the terminal 30B and the terminal connecting portion 32 of the terminal 30C is, for example, the interval P2. Further, the interlock connector 72 may be provided outwardly of the terminal 30A in the first direction D1. For example, the interlock connector 72 may be so provided that the terminal 30B, the terminal 30A and the interlock connector 72 are arranged in this order in the first direction D1. In this case, the interval between the terminal connecting portion 32 of the terminal 30B and the terminal connecting portion 32 of the terminal 30C may be the interval P1.

The interlock connector 72 in the above embodiment may be omitted.

The shape of the wire connecting portion 31 in the above embodiment is not particularly limited. For example, the bent portion 34 in the wire connecting portion 31 may be omitted.

The shape of the terminal connecting portion 32 in the above embodiment is not particularly limited. For example, the insertion hole 35 in the terminal connecting portion 32 may be omitted. In this case, a pin-shaped male terminal can be adopted as the terminal connecting portion 32 of the terminal 30 and a female terminal can be adopted as the mating terminal 202. This modification can be similarly applied also to the terminal 90.

In the connector 20 of the above embodiment, the terminal connecting portion 32 of the terminal 30 may be located inside the opening 53 of the housing 50. In this case, the mating terminal 202 is located inside the opening 53 with the connector 20 mounted on the case 200.

In the above embodiment, the first connecting portions 120 and the second connecting portions 130 of the wires 110 may not be respectively embedded in the housing 50 and the housing 100. In this case, sealing members for sealing between holding portions 52, 102 configured such that the wires 110 are insertable thereinto and the wires 110 can be provided for the holding portions 52, 102.

The number of the terminals 30 in the connector 20 of the above embodiment can be changed as appropriate.

The number of the terminals 90 in the connector 80 of the above embodiment can be changed as appropriate.

The connector 20 of the above embodiment may include terminals different from the terminals 30. Similarly, the connector 80 of the above embodiment may include terminals different from the terminals 90.

In the above embodiment, the connector 20 is applied as the connector to be electrically connected to the inverter and the connector 80 is applied as the connector to be electrically connected to the motor. Without limitation to this, the connector 80 may be applied as the connector to be electrically connected to the inverter and the connector 20 may be applied as the connector to be electrically connected to the motor.

Although the wiring harness 10 is applied as the wiring harness for electrically connecting the inverter and the motor in the above embodiment, there is no limitation to this. For example, the wiring harness 10 may be applied as a wiring harness for electrically connecting two or more electrical devices installed in the vehicle besides the inverter and the motor.

The wires 110 in the above embodiment may be low-voltage wires to which a low voltage is applied.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

three or more first terminals to be electrically connected to wires; and a housing for holding the three or more first terminals, wherein:

the three or more first terminals are arranged along a first direction, each of the first terminals includes a first wire connecting portion to be connected to the wire, a first terminal connecting portion to be connected to a mating terminal and a first intermediate portion provided between the first wire connecting portion and the first terminal connecting portion, three or more of the first terminal connecting portions are arranged at first intervals along the first direction, three or more of the first wire connecting portions are arranged at second intervals along the first direction, the first intervals and the second intervals are different from each other, three or more of the first intermediate portions are formed to have mutually different shapes according to differences between the first intervals and the second intervals, and the three or more first terminals include identifying portions for mutual identification.

2. The connector of claim 1, wherein:

the three or more first terminal connecting portions are arranged at regular first intervals along the first direction, the three or more first wire connecting portions are arranged at regular second intervals along the first direction, deviation amounts in the first direction between the first wire connecting portions and the first terminal connecting portions in the three or more first terminals increase in an arithmetic progression according to the differences between the first intervals and the second intervals, and the three or more first intermediate portions are formed to have mutually different shapes according to the deviation amounts in the corresponding first terminals.

3. The connector of claim 2, wherein each of the first terminals has a width extending in the first direction, and the differences between the first intervals and the second intervals are smaller than the width of the first terminal.

4. The connector of claim 1, wherein the identifying portion is provided in a part of the first terminal not covered by the housing.

5. The connector of claim 4, wherein:

the housing includes an opening, each of the first terminals includes the first wire connecting portion extending in a second direction intersecting the first direction toward inside of the opening, the first intermediate portion extending along a penetration direction of the opening from the inside of the opening, and the first terminal connecting portion extending toward a side opposite to the first wire connecting portion from the first intermediate portion in the second direction, and the identifying portion is provided on a surface of the first intermediate portion extending along the penetration direction.

6. The connector of claim 1, wherein the identifying portion is printing formed on the first terminal.

7. The connector of claim 1, further comprising:

a second terminal provided side by side with the three or more first terminals along the first direction; and an interlock connector provided between the first terminal and the second terminal in the first direction, the second terminal including the identifying portion.

8. The connector of claim 7, wherein:

the second terminal includes a second wire connecting portion to be connected to the wire, a second terminal connecting portion to be connected to the mating terminal and a second intermediate portion provided between the second wire connecting portion and the second terminal connecting portion, an interval between the first terminal connecting portion and the second terminal connecting portion adjacent in the first direction is larger than the first intervals, and an interval between the first wire connecting portion and the second wire connecting portion adjacent in the first direction is equal to the second intervals.

9. The connector of claim 1, wherein the number of the first terminals is five or more.

10. A wiring harness, comprising:

a first connector including three or more first terminals and a housing for holding the three or more first terminals;

a second connector including three or more third terminals; and three or more wires for electrically connecting the respective first terminals and the respective third terminals, wherein:

the three or more first terminals are arranged along a first direction, each of the first terminals includes a first wire connecting portion to be connected to the wire, a first terminal connecting portion to be connected to a mating terminal and a first intermediate portion provided between the first wire connecting portion and the first terminal connecting portion, the three or more third terminals are arranged along the first direction, each of the third terminals includes a third wire connecting portion to be connected to the wire, three or more of the first terminal connecting portions are arranged at first intervals along the first direction, three or more of the first wire connecting portions are arranged at second intervals along the first direction, three or more of the third wire connecting portions are arranged at the second intervals along the first direction, the first intervals and the second intervals are different from each other, three or more of the first intermediate portions are formed to have mutually different shapes according to differences between the first intervals and the second intervals, and the three or more first terminals include identifying portions for mutual identification.

11. The wiring harness of claim 10, wherein the respective wires have the same length.

12. The wiring harness of claim 10, wherein:

one of the first connector and the second connector is electrically connected to an inverter, the other of the first connector and the second connector is electrically connected to a motor, and the three or more wires are high-voltage wires to which a high voltage is applied.

* * * * *